(12) United States Patent
Kulzick et al.

(10) Patent No.: US 6,437,087 B1
(45) Date of Patent: Aug. 20, 2002

(54) POLYESTER RESIN FOR POWDER COATING

(75) Inventors: Matthew A. Kulzick, Warrenville; Wayne R. Pretzer, Wheaton, both of IL (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/697,209

(22) Filed: Oct. 26, 2000

(51) Int. Cl.[7] .............................................. C08G 63/02
(52) U.S. Cl. ....................... 528/272; 528/176; 528/190; 528/193; 528/194; 528/271
(58) Field of Search ................................ 528/176, 190, 528/193, 194, 271, 272

(56) References Cited

U.S. PATENT DOCUMENTS 5,637,654 A    6/1997   Panandiker ............... 525/437
6,087,469 A * 7/2000   Epple et al. ................ 528/307

FOREIGN PATENT DOCUMENTS

EP          957142       11/1999

* cited by examiner

*Primary Examiner*—Terressa M. Boykin
(74) *Attorney, Agent, or Firm*—Mary Jo Kanady; James R. Henes

(57) ABSTRACT

An unsaturated carboxyl group-terminated polyester resin having suitable properties for use in a powder coating for wood and other temperature-sensitive substances is disclosed.

13 Claims, No Drawings

POLYESTER RESIN FOR POWDER COATING

BACKGROUND OF THE INVENTION

This invention relates generally to an unsaturated carboxyl group-terminated polyester resin for use in powder coating and more particularly concerns an aforesaid unsaturated polyester having suitable properties for use in a powder coating for wood, plastic, and other temperature-sensitive substrates.

Powder coatings offer the advantages of high coating efficiency, excellent mechanical properties and zero emission of volatile organic compounds. Carboxyl group terminated polyester resins for use in powder coatings are well known in the art, and in practice these polyesters are processed with epoxy resins to form binding agents for powder coatings. Unsaturated polyester resins are also finding use in powder coating where they are cured, through the unsaturation along their backbone, by UV or other irradiation. Carboxy terminated unsaturated polyester resins could be cured by both irradiation and reaction with epoxy compounds. These coatings are particularly useful since they can be cured at much lower temperature than conventional powder coatings. This saves in energy costs, reduces coating times, and allows powder coatings to be used on heat sensitive substrates such as wood and engineered wood, plastics, and prefabricated articles containing heat sensitive components such as motors and radiators. Curing by both epoxy reaction and irradiation will allow powder coatings to be formed which have much higher hardness than can be achieved by either method alone. This is particularly useful in applications subject to significant surface wear such as counter tops. Powder coatings based on polyester resins are particularly desirable in some applications because of their excellent appearance, resistance to overbake, mechanical properties and weatherability. They have found application in coating a wide range of metal substrates, and it would be highly desirable to be able to use powder coatings based on polyester resins on nonmetallic temperature sensitive substrates such as wood, engineered wood products and plastics. Many such temperature sensitive substrates are exposed directly or indirectly to sunlight or heat. Because of their superior weatherability and color stability, powder coatings based on polyester resins would be particularly effective for use with temperature sensitive substrates, for example, engineered wood products such as medium density fiber board. UV cured powder coatings based on unsaturated carboxy functional powder coatings would have the additional advantage of much better scratch resistance and durability.

Excellent surface smoothness and hardness and a low curing temperature are properties that a powder coating must have for use with temperature sensitive substrates. Existing powder coatings based on polyester resins generally possess the requisite properties of surface hardness and low curing temperature but do not form surfaces with the smoothness comparable to other finishing methods. The inability of powder coatings based on polyester resins to provide the requisite surface smoothness is generally the result of the high viscosities of the polyester resin bases. Achieving a surface smoothness that is equivalent to that achieved with other finishing systems such as liquid paints and laminates is essential in order for powder coatings based on polyester resins to be used effectively with temperature-sensitive substrates such as wood, engineered wood products and plastics.

In order to form a smooth finish, the powder coating must melt within a particular temperature range to permit timely and ample flow of the polymeric material prior to crosslinking. It is also essential that the formulated coating powders remain in a free-flowing, finely divided state for a reasonable period of time after they are manufactured and packaged. Most polyester resins that are used as binders for powder coatings are amorphous solids. The use of multiple components to produce resins having specialized properties generally reduces their potential for crystallinity. The resulting glass transition temperature ($T_g$) of these resins must exceed the storage temperature to which the formulated powder will be exposed. When storage temperatures reach or exceed the $T_g$, the amorphous resin begins to "cold flow", resulting in agglomeration of the finely divided particles, thereby rendering the powder unsuitable for application. Therefore, the $T_g$ and melt viscosity are important considerations for powder coating resins.

Unsaturated polyesters must contain sufficient double bonds to achieve required property improvements most noticeably hardness. It is known that the hardness of fully cured unsaturated resins is a function of the number of double bonds found along the backbone of a particular polymer. For powder coating applications a high number of unsaturations, 4–6 per chain is desirable. Upon irradiation this will form a very highly crosslinked network and give very high surface hardness.

The viscosity and glass transition temperature of unsaturated polyester resins are critical properties for the ultimate performance of the formulated powder coating. Resins with a lower melt viscosity are desirable because they flow together and fuse better to provide a smoother and a more even appearance, and they are easier to process into a powder. It would be desirable to develop a powder-coating composition with substantially the same or better flow and/or appearance and lower viscosity under ordinary use conditions. This cannot be done at the expense of the glass transition temperature of the resin. A glass transition temperature of 45° C. must be maintained and a glass transition temperature of over 50° C. is preferred if the formulated coating is to remaining free flowing during storage.

It is therefore a general object of the present invention to provide an improved unsaturated polyester resin that is suitable as a base material for a powder coating for a temperature sensitive substrate.

More particularly, it is an object of the present invention to provide an improved carboxyl terminated polyester resin having a viscosity of less than 2000 centipoise as well as a sufficient glass transition temperature, acid number, and hydroxyl number to be useful in a powder coating for a temperature sensitive substrate.

Other objects and advantages of the present invention will become apparent upon reading the following detailed description and appended claims.

SUMMARY OF THE INVENTION

The present invention is an unsaturated carboxyl group terminated polyester resin for use in a powder coating and comprising (a) from about 20 to about 35 mole percent of an aromatic diacid component of which at least 75 mole percent is isophthalic acid, (b) from about 15 to about 30 mole percent of an unsaturated diacid component which is preferably fumaric acid, maleic acid, or maleic anhydride, (c) from about 25 to about 45 mole percent of a hindered diol component containing from 4 to 13 carbon atoms which is preferably neopentyl glycol, 2-methyl-1,3-propanediol, 2,2-butylethyl-1,3-propanediol, or combinations of the aforementioned, (d) from about 0 to about 15 mole percent of a 1,2 dihydroxyl component preferably ethylene glycol or 1,2-propanediol, and (e) from about 0 to about 20 mole percent of a cyclic diol component taken from the group cyclohexanedimethanol, 2,2-bis-[4-(2-hydroxyethoxy) phenyl]-propane, (ethylene oxide adduct of bis-phenol A), 2-[bis-(4-hydroxycyclohexyl)]-propane (hydrogenated bis-phenol A), and ethylene or propylene oxide adducts of bis-phenols, or other hydrogenated bis-phenols, preferably 2,2-bis-[4-(2-hydroxylethoxy)phenyl]-propane, and/or 2-[bis-(4-hydroxycyclohexyl)]-propane such that the resulting unsaturated carboxyl group terminated polyester resin has a glass transition temperature of 44° to 55° C., an acid number of 35–55 milligrams of potassium hydroxide per gram of resin, a hydroxyl number less than 10 milligrams of potassium per gram of resin, an average of 4–6 unsaturations per polymer chain, and a viscosity of less than 2000 centipoise when measured at 200° C. using an ICI cone and plate viscometer.

DETAILED DESCRIPTION OF THE PREFERRED EMBODIMENTS

Polyester resins find use in polyester-isocyanate, polyester-epoxy hybrid, and polyester-triglycidylisocyanurate systems. The stability of the finished polyester resin-based powder coating material during storage, the flow properties of the enamel during the cure cycle, and the ultimate performance of the cross-linked coating are all dependent upon the composition of the polyester binder resin.

The carboxyl group terminated polyesters of the present invention are prepared by well known polycondensation methods, for example, by esterification or interesterification, optionally in the presence of typical catalysts such as dibutyl tin or tetrabutyl titanate whereby, through a suitable choice of reaction conditions, polyester resins having the desired properties are obtained.

After being formed, the polyester resins of the present invention have a glass transition temperature of 44° to 55° C., an acid number of 35–55 milligrams of potassium hydroxide per gram of resin, a hydroxyl number of less than 10 milligrams of potassium hydroxide per gram of resin, contain 4–6 unsaturations per chain on average, and a viscosity of less than 2000 centipoise as measured by an ICI cone and plate viscometer at 200° C.

It has been found that this particular combination of glass transition temperature, acid number, hydroxyl number, unsaturation, and viscosity render a polyester resin of the present invention especially useful in powder coatings for use on temperature sensitive substrates. The glass transition temperature must exceed the storage temperature to which the formulated powder will be exposed. Furthermore, in order to form a smooth finish, the powder coatings must melt and have a sufficiently low viscosity within a particular temperature range to permit timely and ample flow of the polyester resin prior to crosslinking.

However, the viscosity of the polyester resin is influenced by a number of conflicting factors. For example, the viscosity of a resin is lower if its molecular weight is lower. However, the acid number of the resin is too high if the molecular weight of the resin is too low. Similarly, the viscosity of a resin is lower if its branching is eliminated or reduced. However, increased levels of branching improve the reactivity of the polyester resin so that it gels rapidly upon formulation. Furthermore, resins with flexible backbones have lower viscosities. However, the backbone of the resin must be rigid enough to give a sufficiently high glass transition temperature. Higher levels of unsaturation reduce the viscosity of the resin and reduce the resins glass transition temperature. The composition of the polyester resin is critically important in achieving the balance of glass transition temperature, acid number, hydroxy number, unsaturation, and viscosity of the resin that are necessary to use it in powder coating compositions.

A polyester resin of the present invention is prepared from an aromatic diacid component, an unsaturated diacid component, a hindered diol component, a 1,2-diol component, and a cyclic diol component, and contains moieties that are derived from each of those materials. Thus, a polyester resin of the present invention is comprised of from about 20, preferably from about 25, to about 35, preferably to about 32, mole percent of the aromatic diacid component of which at least 75 mole percent is isophthalic acid. The remainder, if any, of the aromatic diacid component is terephthalic acid or phthalic acid, and preferably is terephthalic acid.

A polyester resin of the present invention is also comprised of from about 15, preferably from about 22, to about 30 and preferably to about 25 mole percent of an unsaturated diacid component component. This diacid component comprises an unsaturated diacid or anhydride containing from two to ten carbon atoms. Suitable diacids include fumaric acid, maleic acid, maleic anhydride, 4-cyclohexene-1,2-dicarboxylic acid or anhydride, with fumaric acid, maleic acid, and maleic anhydride being preferred.

A polyester resin of the present invention is also comprised of from about 25 to about 45 mole percent of a hindered diol component containing from 4 to 13 carbon atoms including 2,2-dimethylpropanediol-1,3 (i.e., neopentyl glycol), hexane-2,5-diol, 2-methyl-1,3-propanediol, and 2,2-butylethyl-1,3-propanediol, and is preferably neopentylglycol.

A polyester resin of the present invention is also comprised of from about zero, preferably from about five, to about 20, preferably to about 15 percent of a 1,2-diol component containing 2–8 carbon atoms including ethylene glycol, 1,2-propanediol, 1,2-butanediol, 2,3-butanediol, 1,2-hexanediol, 1,2-phenyl-ethanediol, 1,2-cyclohexylethanediol, where ethylene glycol and 1,2-propanediol are preferred.

A polyester resin of the present invention is also comprised of from about zero, preferably from about five, to about twenty mole percent of a cyclic diol component including 2,2-[bis-(4-hydroxycyclohexyl)]-propane (i.e. hydrogenated bis-phenol A), 1,4-dimethylolcyclohexane, and 2,2-bis-[4-(2-hydroxylethoxy)phenyl]-propane (i.e. ethylene oxide adduct of bis-phenol A), and propylene oxide or ethylene oxide adducts of other diphenols. Preferably, the cyclic diol component is 2,2-[bis-(4-hydroxycyclohexyl)]-propane or 2,2-bis-[4-(2-hydroxylethoxy)phenyl]-propane.

One preferred embodiment of a polyester resin of the present invention comprises (a) from about 26 to about 33 mole percent of an aromatic diacid component comprising at least about 75 weight percent of isophthalic acid and up to about 25 weight percent of terephthalic acid; (b) from about 20 to about 24 mole percent of an unsaturated diacid preferably fumaric acid or maleic anhydride; (c) from about 25 to about 38 mole percent neopentyl glycol, (d) from about 5 to about 10 mole percent of ethylene glycol, and (e) from about 6 to about 20 percent 2,2-bis-[4-(2-hydroxylethoxy) phenyl]-propane; such that the acid number is from about 40 to about 45 milligrams of potassium hydroxide per gram of polyester resin, a hydroxyl number of less than about 10 milligrams of potassium hydroxide per gram of polyester resin, unsaturation of four to five units per chain, a glass transition temperature of 45–55° C. and a melt viscosity of less than about 2000 centipoise as measured at 200° C. using an ICI cone and plate viscometer.

Another preferred embodiment of a polyester resin of the present invention comprises (a) from about 26 to about 30 mole percent of an aromatic diacid component comprising at least about 75 weight percent of isophthalic acid and up to about 25 weight percent of terephthalic acid; (b) from about 22 to about 26 mole percent of an unsaturated diacid preferably fumaric acid or maleic anhydride; (c) from about 25 to about 35 mole percent neopentyl glycol, (d) from about 5 to about 10 mole percent of ethylene glycol, and (e) from about 5 to about 10 mole percent 2,2-[bis-(4-hydroxycyclohexyl)]-propane; such that the acid number is from about 40 to about 45 milligrams of potassium hydroxide per gram of polyester resin, a hydroxyl number of less than about 10 milligrams of potassium hydroxide per gram of polyester resin, unsaturation of four to five units per chain, a glass transition temperature of 45–52° C. and a melt viscosity of less than about 2000 centipoise as measured at 200° C. using an ICI cone and plate viscometer.

The present invention will be more clearly understood from the following specific examples. While the invention is described in connection with the specific examples below, it is to be understood that these are for illustrative purposes only. Many alternatives, modifications and variations will be apparent to those skilled in the art in the light of the examples below, and such alternatives, modifications and variations fall within the scope and spirit of the appended claims.

EXAMPLE 1

3.92 moles of neopentyl glycol, 1.02 moles ethylene glycol, and 2.20 moles of Dianol 220 (2,2-bis-[4-(2-hydroxylethoxy)phenyl]-propane) were introduced into a reactor equipped with a steam jacketed adiabatic condenser, an inert gas inlet, a mechanical stirrer, a thermocouple, a condenser and a collector for condensed vapor (water). The reactor contents were heated to 130° C. until the glycols melted. Then 3.38 moles of isophthalic acid, 1.13 moles of terephthalic acid, 2.01 mole of fumaric acid, and 1.0 gram of Fascat 4100 were introduced to the reactor, and the reactor contents were heated until the temperature reached 230° C. At this point, 95 weight percent of the theoretical amount of water produced in the polyesterification reaction had been collected in the condensed vapor collector. The reaction mixture was sampled and its carboxyl number was determined. When the carboxyl number was under 10 mg/g, the reaction was cooled to 210° C. and 1.29 moles of additional fumaric acid was added. The reaction was heated to 230° C. and allowed to continue until the carboxyl number of the reaction mixture reached 40–42 milligrams of potassium hydroxide per gram of the polyester resin product, a hydroxyl number of 5 milligrams of potassium hydroxide per gram of the resin, a glass transition temperature of 54° C. and an ICI viscosity at 200° C. of 1950 centipoise.

EXAMPLES 2–7

Following the procedure of Example 1, a series of polyesterifications was performed in Examples 2–7 using the materials and their amounts shown in Table 1 to obtain carboxyl-terminated unsaturated polyesters having the properties also shown in Table 1. Approximately, sixty percent of the unsaturated diacid component was added in the first stage of the reaction and the remainder was added in the second stage. It is also possible to produce the resins by adding all of the unsaturated diacid component at the beginning and allowing the mixture to react directly to an acid number of 40–42 mg KOH/g resin.

The results shown in Tables 1 illustrate suitable compositions where the combination of materials of the invention yielded polyester resins with the desired combination of properties.

TABLE 1

| Example | 1 | 2 | 3 | 4 | 5 | 6 | 7 |
|---|---|---|---|---|---|---|---|
| Materials (mole %) | | | | | | | |
| Neopentyl glycol | 26.2 | 37.9 | 34 | 41.4 | 34.6 | 36.4 | 32.9 |
| Ethylene glycol | 6.8 | — | 6.7 | — | 6.8 | 5.0 | 10.0 |
| 2,2-bis-[4-(2-hydroxyethoxy)phenyl]-propane | 14.7 | 10.0 | 7.3 | 6.7 | 6.7 | — | — |
| 2,2-[bis-(4-hydroxycyclohexyl)]-propane | — | — | — | — | — | 6.7 | 5.3 |
| Isophthalic Acid | 22.6 | 29.9 | 22.4 | 29.8 | 29.8 | 29.8 | 32.3 |
| Terephthalic Acid | 7.5 | — | 7.5 | — | — | — | — |
| Maleic anhydride | — | 22.2 | 22.2 | 22.1 | 22.1 | 23.1 | 19.5 |
| fumaric acid | 22.2 | — | — | — | — | — | — |
| Properties | | | | | | | |
| Acid Number (mg-KOH/g) | 42 | 39 | 35 | 38 | 38 | 40 | 43 |
| Glass transi- | 54 | 47 | 46 | 46 | 48 | 46 | 46 |

TABLE 1-continued

| Example | 1 | 2 | 3 | 4 | 5 | 6 | 7 |
|---|---|---|---|---|---|---|---|
| tion temperature (° C.) | | | | | | | |
| ICI Viscosity @ 200° C. (centipoise) | 1950 | 1200 | 1400 | 950 | 1200 | 1900 | 1950 |
| Unsaturation (units/chain) | 4.1 | 4.4 | 4.8 | 4.8 | 4.8 | 4.5 | 4.6 |

From the above description, it is apparent that the objects of the present invention have been achieved. While only certain embodiments and various modifications have been described, numerous alternative embodiments and various modifications will be apparent from the above description to those skilled in the art. These alternatives and embodiments are considered equivalents and within the spirit and scope of the present invention.

That which is claimed is:

1. An unsaturated carboxyl group-terminated polyester resin for use in a powder coating and comprising
   (a) from about 20 to about 35 mole percent of an aromatic diacid component where at least 75% of the aromatic diacid component is isophthalic acid
   (b) from about 15 to about 30 mole percent of an unsaturated diacid component
   (c) from about 25 to about 45 mole percent of a hindered diol component
   (d) from about 0 to about 20 mole percent of a C2–C8 1,2 diol component
   (e) from about 0 to about 20 mole percent of a cyclic diol component such that the resulting unsaturated carboxy group terminated polyester resin has a glass transition temperature of 44° to 55° C., an acid number of 35–55 milligrams of potassium hydroxide per gram of resin, a hydroxyl number less than 10 milligrams of potassium per gram of resin, an average of 4 to 6 unsaturations per polymer chain, and a melt viscosity of less than 2000 centipoise as measured at 200° C. using an ICI cone and plate viscometer.

2. The polyester resin of claim 1 comprising from about 25 to about 32 mole percent of the aromatic diacid component where at least 75% of this component is isophthalic acid.

3. The polyester resin of claim 1 wherein terephthalic acid comprises up to 25 mole percent of the aromatic diacid component.

4. The polyester resin of claim 1 wherein the hindered diol component is at a level of from about 25 to about 45 mole percent.

5. The polyester resin of claim 1 wherein the hindered diol component comprises at least one glycol containing from four to thirteen carbon atoms.

6. The polyester resin of claim 1 wherein the hindered diol component comprises at least one of neopentyl glycol and 2-methyl-1,3-propanediol.

7. The polyester resin of claim 1 wherein the 1,2 two to eight carbon diol component comprises at least one of ethylene glycol and 1,2-propaneglycol.

8. The polyester resin of claim 1 wherein the unsaturated diacid or anhydride component is at a level of twenty-two to twenty-five percent.

9. The polyester resin of claim 1 wherein the unsaturated diacid or anhydride comprises at least one of fumaric acid, maleic acid, maleic anhydride, or 4-cyclohexene-1,2-dicarboxylic acid.

10. The polyester resin of claim 1 wherein the cyclic diol comprises at least one of 2,2-[bis-(4-hydroxycyclohexyl)]-propane (i.e. hydrogenated bis-phenol A), 1,4-dimethylolcyclohexane, and 2,2-bis-[4-(2-hydroxyethoxy)phenyl]-propane (i.e. ethylene oxide adduct of bis-phenol A), and propylene oxide or ethylene oxide adducts of other diphenols.

11. The polyester of claim 10 where the cyclic diol comprises at least one of 2,2-[bis-(4-hydroxycyclohexyl)]-propane or 2,2-bis-[4-(2-hydroxylethoxy)]-phenylpropane.

12. The unsaturated carboxyl group terminated polyester resin of claim 1 wherein
   (a) 28 to 35 mole percent of an aromatic diacid component where at least 75% of the aromatic diacid component is isophthalic acid and up to 25% is terephthalic acid
   (b) 20 to 24 percent of an unsaturated diacid component where the diacid component comprises at least one of fumaric acid, maleic acid, or maleic anhydride
   (c) 25 to 38 percent neopentyl glycol
   (d) 5 to 15 percent ethylene glycol or propylene glycol
   (e) 6 to 20 percent of 2,2-bis-[4-(2-hydroxylethoxy)phenyl]-propane such that the resulting carboxy group terminated, unsaturated, polyester resin has a glass transition temperature of 44° to 55° C., an acid number of 35–55 milligrams of potassium hydroxide per gram of resin, a hydroxyl number less than 10 milligrams of potassium per gram of resin, 4 to 5 unsaturations per polymer chain, and a melt viscosity of less than 2000 centipoise as measured by ICI cone and plate viscometer.

13. The unsaturated carboxyl group terminated polyester resin of claim 1 wherein
   (a) 26 to 30 mole percent of an aromatic diacid component where at least 75% of the aromatic diacid component is isophthalic acid and up to 25% is terephthalic acid
   (b) 22 to 26 percent of an unsaturated diacid component where the diacid component comprises at least one of fumaric acid, maleic acid, or maleic anhydride
   (c) 25 to 35 percent neopentyl glycol
   (d) 5 to 10 percent ethylene glycol or propylene glycol
   (e) 5 to 10 percent of 2,2-[bis-(4-hydroxycyclohexyl)]-propane such that the resulting carboxy group terminated, unsaturated, polyester resin has a glass transition temperature of 44° to 55° C., an acid number of 35–55 milligrams of potassium hydroxide per gram of resin, a hydroxyl number less than 10 milligrams of potassium per gram of resin, 4 to 5 unsaturations per polymer chain, and a melt viscosity of less than 2000 centipoise as measured by ICI cone and plate viscometer.

* * * * *

UNITED STATES PATENT AND TRADEMARK OFFICE
CERTIFICATE OF CORRECTION

PATENT NO. : 6,437,087 B1
DATED : August 20, 2002
INVENTOR(S) : Matthew A. Kulzick and Wayne R. Pretzer It is certified that error appears in the above-identified patent and that said Letters Patent is hereby corrected as shown below:

Column 2,
Line 18, "property improvements most" should read -- property improvements, most --
Line 19, "noticeably hardness. It is" should read -- noticeably, hardness. It is --
Line 22, "applications a high number" should read -- applications, a high number --
Line 23, "per chain is desirable." should read -- per chain, is desirable. --
Line 39, "to remaining free flowing" should read -- to remain free flowing --

Column 4,
Line 8, "Apolyester resin of" should read -- A polyester resin of --
Line 23, "diacid component component. This diacid" should read -- diacid component. This diacid --
Lines 60 and 61, "diacid preferably fumaric acid" should read -- diacid, preferably fumaric acid --
Line 62, "glycol, (d) from about" should read -- glycol; (d) from about --
Line 63, "glycol, and (e) from" should read -- glycol; and (e) from --

Column 5,
Lines 11 and 12, "diacid preferably fumaric acid" should read -- diacid, preferably fumaric acid --
Line 13, "glycol, (d) from about" should read -- glycol; (d) from about --
Line 14, "glycol, and (e) from" should read -- glycol; and (e) from --
Line 34, "1.02 moles ethylene" should read -- 1.02 moles of ethylene --
Line 42, "2.01 mole of fumaric" should read -- 2.01 moles of fumaric --
Line 43, "introduced to the reactor," should read -- introduced into the reactor --
Line 50, "fumaric acid was added." should read -- fumaric acid were added. --.
Line 63, "Approximately, sixty percent of" should read -- Approximately sixty percent of --

UNITED STATES PATENT AND TRADEMARK OFFICE
CERTIFICATE OF CORRECTION

PATENT NO. : 6,437,087 B1
DATED : August 20, 2002
INVENTOR(S) : Matthew A. Kulzick and Wayne R. Pretzer It is certified that error appears in the above-identified patent and that said Letters Patent is hereby corrected as shown below:

Column 6,
Line 3, "shown in Tables 1 illustrate" should read -- shown in Table 1 illustrate --

Signed and Sealed this

Eighteenth Day of February, 2003

JAMES E. ROGAN
*Director of the United States Patent and Trademark Office*